(12) United States Patent
Hazel, III

(10) Patent No.: US 9,650,752 B2
(45) Date of Patent: May 16, 2017

(54) METHOD AND APPARATUS FOR RECOVERING SPILLED OIL IN ICE INFESTED WATERS

(71) Applicant: Marine Pollution Control Corporation, Detroit, MI (US)

(72) Inventor: William Hazel, III, Detroit, MI (US)

(73) Assignee: Marine Pollution Control Corporation, Detroit, MI (US)

( * ) Notice: Subject to any disclaimer, the term of this patent is extended or adjusted under 35 U.S.C. 154(b) by 0 days.

(21) Appl. No.: 15/094,506

(22) Filed: Apr. 8, 2016

(65) Prior Publication Data

US 2016/0362862 A1 Dec. 15, 2016

Related U.S. Application Data

(60) Provisional application No. 62/174,087, filed on Jun. 11, 2015.

(51) Int. Cl.
*E02B 15/02* (2006.01)
*E02B 15/08* (2006.01)
*C02F 1/40* (2006.01)
*C02F 3/10* (2006.01)

(52) U.S. Cl.
CPC ............... *E02B 15/02* (2013.01); *C02F 1/40* (2013.01); *C02F 3/103* (2013.01); *E02B 15/0807* (2013.01); *E02B 15/0814* (2013.01)

(58) Field of Classification Search
USPC ....... 405/60, 61, 63, 64, 66, 211; 210/242.3, 210/776, 922, 923
See application file for complete search history.

(56) References Cited

U.S. PATENT DOCUMENTS

| 4,668,389 A | * | 5/1987 | Eriksson | B01D 17/0202 210/155 |
| 5,071,286 A | * | 12/1991 | Separovich | E02B 15/08 405/66 |
| 5,110,236 A | * | 5/1992 | Santamaria | E02B 15/0814 405/60 |
| 5,338,132 A | * | 8/1994 | Lahar | B63B 25/082 210/923 |

FOREIGN PATENT DOCUMENTS

WO    WO 92/14002    * 8/1992

* cited by examiner

*Primary Examiner* — Sean Andrish
(74) *Attorney, Agent, or Firm* — Dinsmore & Shohl LLP

(57) ABSTRACT

Apparatus for recovering spilled oil in water infested with floating ice or other debris comprises a fence having an upper rail and lower rail encircling an area to receive an oil skimmer. A plurality of buoyancy units maintain the fence at an appropriate water level. An ice-deflecting cone covers the bottom of the fence when the apparatus is deployed. A plurality of cables may be attached to the upper rail of the fence to raise and lower the apparatus into the water. The fence is preferably circular, with a diameter in the range of 10 to 50 feet. The fence preferably includes a plurality of spaced-apart vertical supports between the upper and lower rails to keep chunks of ice or other debris from entering into the encircled area, and the lower barrier structure is perforated, with openings in the range of less than an inch to several inches.

9 Claims, 2 Drawing Sheets

US 9,650,752 B2

METHOD AND APPARATUS FOR RECOVERING SPILLED OIL IN ICE INFESTED WATERS

REFERENCE TO RELATED APPLICATION

This application claims priority to U.S. Provisional Patent Application Ser. No. 62/174,087, filed Jun. 11, 2015, the entire content of which is incorporated herein by reference.

GOVERNMENT SUPPORT

The invention was made with Government support under Contract No.: HSCG32-14-C-R00016 awarded by the United States Coast Guard. The Government has certain rights in the invention.

FIELD OF THE INVENTION

This invention relates generally to spilled oil recovery in water and, in particular, to apparatus and methods for recovering spilled oil in ice-infested waters.

BACKGROUND OF THE INVENTION

When oil spills or the like occur in water, one of the important methods of separating the oil from the water involves use of commercial skimmers. These devices, manufactured by a number of companies, float on top of the oil surface and essentially vacuum the oil-coated water and pump it through outlet pipes to separation centers which may be situated on the land or on vessels. However, when the oil contamination is in icy waters, the ice, slush, and debris are sucked toward the skimmer and interfere with the skimmer's ability to efficiently pick up oil.

Typical commercial skimmers useful with the present system include the Elastec TDS 118G Drum skimmer and the Desmi Helix skimmer. Both of these skimmers are described on their manufacturers' websites.

SUMMARY OF THE INVENTION

This invention improves upon oil recovery by providing apparatus for recovering spilled oil with a floating oil skimmer in water infested with floating ice or other debris. The apparatus comprises a fence having an upper rail and lower rail encircling an area to receive an oil skimmer. A plurality of buoyancy units within the encircled area maintain the apparatus in water such that the level of the water is generally between the upper and lower rails of the fence. A lower submerged barrier structure attached to the lower rail of the fence covers the bottom of the fence when the apparatus is deployed, and the fence and barrier structure have openings or perforations to allow water to freely pass therethrough while minimizing the intrusion of floating ice and other debris into the encircled area.

In the preferred embodiment, the lower submerged barrier structure is an ice-deflecting cone. A plurality of cables may be attached to the upper rail of the fence to raise and lower the apparatus into the water. The fence is preferably circular, with a diameter in the range of 10 to 50 feet. The bottom of the lower submerged barrier structure may include an access hatch.

The fence preferably includes a plurality of spaced-apart vertical supports between the upper and lower rails to keep chunks of ice or other debris from entering into the encircled area, and the lower barrier structure is perforated, with openings in the range of less than an inch to several inches.

DETAILED DESCRIPTION OF THE INVENTION

Figure 1:
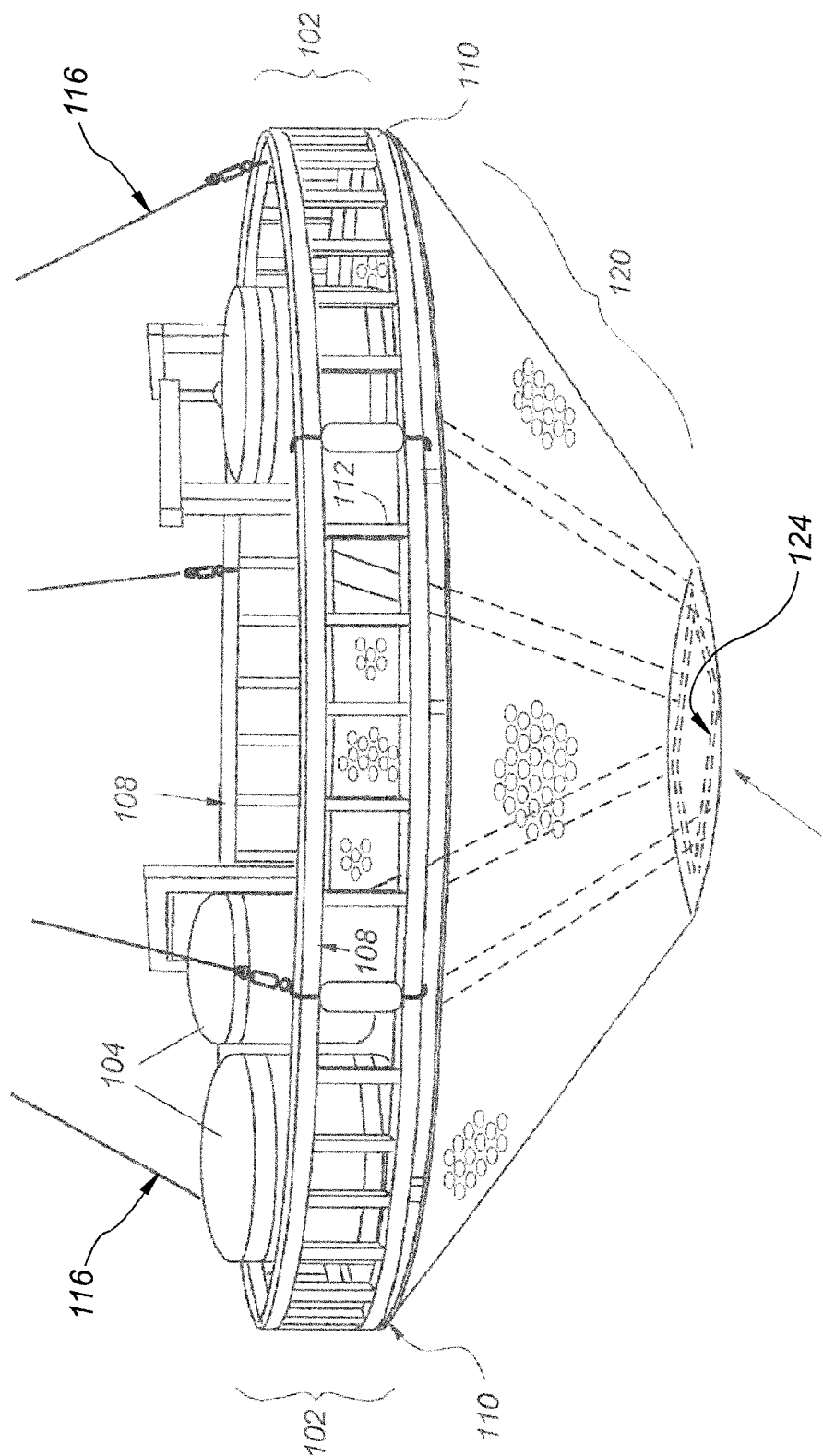
FIG. 1 is a drawing that shows the preferred embodiment of the invention with its own set of buoyancy units.

FIG. 1 illustrates a preferred embodiment of the ice management system of the present invention. As seen in the drawing, the system comprises a fence 102 surrounding an area in which a commercial skimmer is supported and operates. The fence is preferably circular and, given the size of commercial skimmers, the fence has a diameter in the range of 10 to 50 feet, more preferably about 15 to 25 feet. The fence preferably has a height in the range of one to five feet or more depending upon environmental factors such as wave height.

The fence 102 is floated by a plurality of buoyancy units 104 which are attached at spaced intervals about the inner diameter of the fence. Typically at least three of the buoyancy units support the fence with its lower end extending into the body of water and its upper end projecting above the body.

The preferred embodiment of the fence 102 comprises an upper fence rail 108, preferably formed of tubing, and a lower rail 110 which may be formed of tubing or sheet metal. A number of flat posts 112 extend between the upper and lower rails at spaced intervals sufficiently close to one another to prevent any large ice sheets or blocks to pass into the interior skimming area of the enclosed system. A plurality of steel cables 116 may be secured around the periphery of the rail structure to raise and lower the apparatus into the icy water.

The apparatus further includes a lower submerged barrier structure attached to the lower edge of the fence to cover the bottom of the fence when the apparatus is deployed. In the preferred embodiment this structure is an ice-deflecting cone 120, with the cone shaped being preferred to move chunks of ice out of the way as the apparatus is lowered into the water. The ice-deflecting structure is preferably formed of perforated stainless steel sheets, having a larger, upper end of approximately the same diameter as the fence and is secured at spaced points to the lower element of the fence. The sides of the cone 120 are formed by generally truncated triangular sheets of the perforated steel. The bottom, narrow end of the cone 122 is preferably formed by a circle of steel straps with a hatch 124 that can be opened using a cable and latch system for clearing the cone.

Figure 2:
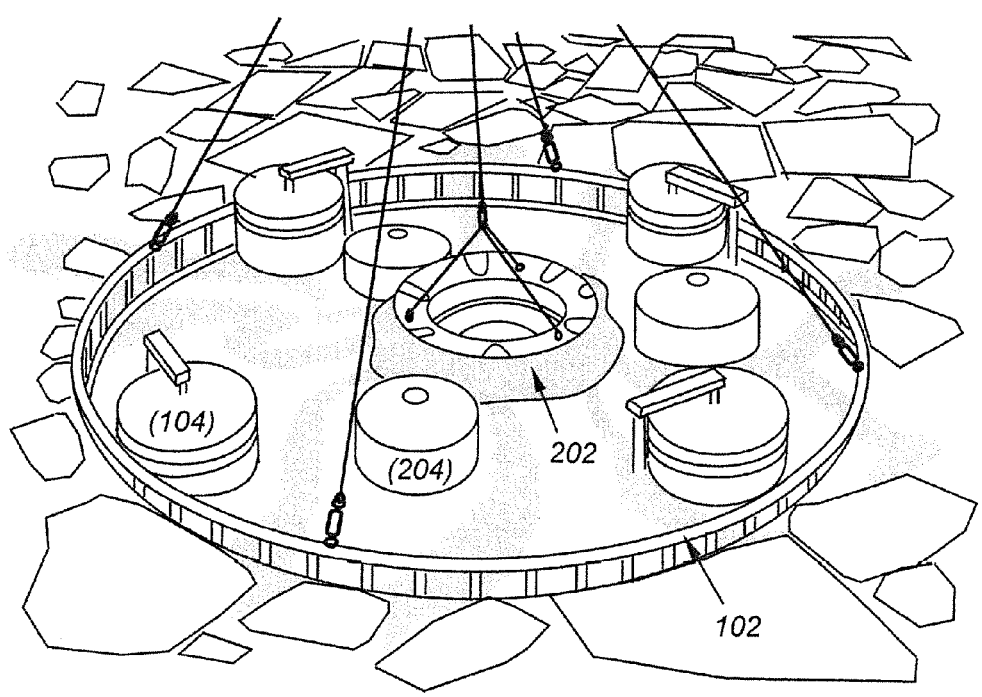
FIG. 2 is a drawing that illustrates the apparatus floating in ice-infested waters with a commercially available oil skimming unit.

FIG. 2 is a drawing that illustrates the apparatus floating in ice-infested waters with a commercially available oil skimming unit 202, in this case a DESMI Helix skimmer. The skimmer 202 is supported in the center of the fence by surrounding buoyancy units, one of which is called out at 204. Flexible tethers extends from fence 102 to the skimmer, and the exhaust hose of the skimmer extends through or over the fence 102.

Note that while the invention described herein is ideally suited to oil recovery in ice-infested waters, the apparatus and methods are equally applicable to recovery in water infested with any floating debris, natural or artificial, such as logs or plant materials, floating wreckage debris, and so forth. In all embodiments, the fence and barrier structure are perforated to allow water to freely pass therethrough while keeping floating ice and other debris out of the encircled area. The minimum size of the perforations is therefore in the range of less than an inch to several inches.

The invention claimed is:

1. An apparatus for recovering spilled oil with a floating oil skimmer in water infested with floating ice or other debris, the water having a level, comprising:
   a fence having an upper rail and lower rail encircling an area to receive the oil skimmer;
   a plurality of buoyancy units to maintain the apparatus in water such that the level of the water is generally between the upper and lower rails of the fence;
   a lower submerged barrier structure attached to the lower rail of the fence to cover the bottom of the fence when the apparatus is deployed, the lower submerged barrier formed of generally truncated triangular sheets and configured such that the barrier structure moves chunks of ice or other debris out of the way as the apparatus is lowered into the water; and
   wherein the fence and barrier structure have openings or perforations to allow water to pass therethrough while minimizing intrusion of floating ice and other debris into the encircled area.

2. The apparatus of claim 1, wherein the lower submerged barrier structure is an ice-deflecting cone.

3. The apparatus of claim 1, further including a plurality of cables attached to the upper rail of the fence to raise and lower the apparatus into the water.

4. The apparatus of claim 1, wherein the fence is circular.

5. The apparatus of claim 1, wherein the fence is circular with a diameter in a range of 10 to 50 feet.

6. The apparatus of claim 1, wherein the bottom of the lower submerged barrier structure includes an access hatch.

7. The apparatus of claim 1, wherein the fence includes a plurality of spaced-apart vertical supports between the upper and lower rails to keep chunks of ice or other debris from entering into the encircled area.

8. The apparatus of claim 1, wherein the lower barrier structure has perforations in a range of less than an inch to several inches.

9. The apparatus of claim 1, wherein the plurality of buoyancy units are disposed within the encircled area.

* * * * *